United States Patent
Tschache et al.

(10) Patent No.: US 10,511,439 B2
(45) Date of Patent: Dec. 17, 2019

(54) METHOD FOR IMPLEMENTING ENCRYPTED CLIENT-SERVER COMMUNICATION

(71) Applicant: VOLKSWAGEN AG, Wolfsburg (DE)

(72) Inventors: Alexander Tschache, Wolfsburg (DE); Timo Winkelvos, Braunschweig (DE)

(73) Assignee: VOLKSWAGEN AG (DE)

( * ) Notice: Subject to any disclaimer, the term of this patent is extended or adjusted under 35 U.S.C. 154(b) by 173 days.

(21) Appl. No.: 15/381,848

(22) Filed: Dec. 16, 2016

(65) Prior Publication Data

US 2017/0180126 A1    Jun. 22, 2017

(30) Foreign Application Priority Data

Dec. 17, 2015 (DE) .................. 10 2015 225 790

(51) Int. Cl.
*H04L 29/06* (2006.01)
*H04L 9/32* (2006.01)
(Continued)

(52) U.S. Cl.
CPC ............ *H04L 9/32* (2013.01); *H04L 9/006* (2013.01); *H04L 9/0819* (2013.01); *H04L 9/0838* (2013.01); *H04L 9/0861* (2013.01); *H04L 9/14* (2013.01); *H04L 9/30* (2013.01); *H04L 63/045* (2013.01); *H04L 63/06* (2013.01); *H04L 2209/80* (2013.01); *H04L 2209/84* (2013.01)

(58) Field of Classification Search
CPC ... H04L 63/045; H04L 63/06; H04L 2209/80; H04L 2209/84
See application file for complete search history.

(56) References Cited

U.S. PATENT DOCUMENTS

| 7,966,634 | B2* | 6/2011 | Hoppe ..................... H04N 7/15 348/14.08 |
| 8,907,770 | B2* | 12/2014 | Huffman ................. B60R 25/04 340/426.13 |

(Continued)

FOREIGN PATENT DOCUMENTS

| DE | 60310814 T2 | 10/2007 |
| DE | 102008050406 A1 | 4/2010 |

(Continued)

OTHER PUBLICATIONS

Search Report for German Patent Application No. 10 2015 225 790.8; dated Aug. 8, 2016.

*Primary Examiner* — Sher A Khan
(74) *Attorney, Agent, or Firm* — Barnes & Thornburg LLP

(57) ABSTRACT

A method for implementing an encrypted client-server communication, wherein the server includes an entry point, service systems behind the entry point, and a secure system. The method includes incorporating common cryptographic material into the client and into the secure system, deriving key material from the common cryptographic material in the client for an encrypted communication between the client and a service system, deriving key material from the common cryptographic material in the secure system for an encrypted communication between the client and a service system, and transferring the key material into the service system or retaining the key material in the secure system.

13 Claims, 4 Drawing Sheets

(51) Int. Cl.
  *H04L 9/00* (2006.01)
  *H04L 9/08* (2006.01)
  *H04L 9/14* (2006.01)
  *H04L 9/30* (2006.01)

(56) References Cited

U.S. PATENT DOCUMENTS

| | | | | |
|---|---|---|---|---|
| 9,147,119 B2* | 9/2015 | Prakash | ............. | G06K 9/00791 |
| 2004/0075539 A1* | 4/2004 | Savoie | ................ | B60R 25/1004 |
| | | | | 340/426.1 |
| 2004/0176071 A1* | 9/2004 | Gehrmann | ............ | H04L 9/0844 |
| | | | | 455/411 |
| 2007/0208681 A1* | 9/2007 | Bucholz | ................. | G08G 1/017 |
| | | | | 706/47 |
| 2009/0089584 A1* | 4/2009 | Bender | ................ | H04L 9/3236 |
| | | | | 713/176 |
| 2009/0212928 A1* | 8/2009 | Aijaz | ...................... | H04L 63/08 |
| | | | | 340/426.1 |
| 2010/0031042 A1* | 2/2010 | Di Crescenzo | ..... | H04L 63/0869 |
| | | | | 713/169 |
| 2010/0287375 A1* | 11/2010 | Lee | ........................ | G06Q 20/04 |
| | | | | 713/171 |
| 2011/0006806 A1* | 1/2011 | Arimoto | ............ | H03K 19/1733 |
| | | | | 326/38 |
| 2013/0139149 A1* | 5/2013 | Boulais | ................... | G06F 8/654 |
| | | | | 717/178 |
| 2014/0079217 A1* | 3/2014 | Bai | ..................... | H04L 63/0869 |
| | | | | 380/270 |
| 2014/0106712 A1* | 4/2014 | Scholz | ................... | G01C 21/26 |
| | | | | 455/411 |
| 2014/0169564 A1* | 6/2014 | Gautama | ........... | G07C 9/00309 |
| | | | | 380/270 |
| 2014/0214267 A1* | 7/2014 | Sellschopp | ............. | B60L 58/12 |
| | | | | 701/34.2 |
| 2015/0094929 A1* | 4/2015 | Bell | ....................... | G07C 5/008 |
| | | | | 701/99 |
| 2015/0145648 A1* | 5/2015 | Winkelman | ....... | G07C 9/00309 |
| | | | | 340/5.72 |
| 2015/0312655 A1* | 10/2015 | Balakrishnan | ......... | H04Q 9/00 |
| | | | | 340/870.07 |
| 2016/0035148 A1* | 2/2016 | Huang | .................. | H04L 9/0866 |
| | | | | 701/31.4 |
| 2016/0072781 A1* | 3/2016 | Zhang | ................... | H04L 63/065 |
| | | | | 726/4 |
| 2016/0099927 A1* | 4/2016 | Oz | .......................... | H04L 63/08 |
| | | | | 726/9 |
| 2016/0162678 A1* | 6/2016 | Kim | .................... | G06F 3/04842 |
| | | | | 726/18 |
| 2016/0366156 A1* | 12/2016 | Kantor | ............... | H04L 63/1416 |

FOREIGN PATENT DOCUMENTS

| | | | | |
|---|---|---|---|---|
| EP | 1257106 A1 | 11/2002 | | |
| EP | 3276911 A1 * | 1/2018 | ......... | H04L 63/0435 |
| WO | WO-2016048177 A1 * | 3/2016 | ............. | G06F 21/57 |

\* cited by examiner

METHOD FOR IMPLEMENTING ENCRYPTED CLIENT-SERVER COMMUNICATION

PRIORITY CLAIM

This patent application claims priority to German Patent Application No. 10 2015 225 790.8, filed 17 Dec. 2015, the disclosure of which is incorporated herein by reference in its entirety.

SUMMARY

Illustrative embodiments relate to a method for implementing an encrypted client-server communication and a client-server system.

BRIEF DESCRIPTION OF THE DRAWINGS

Disclosed embodiments are explained below with reference to the associated drawings, in which.

DETAILED DESCRIPTION

Figure 1:
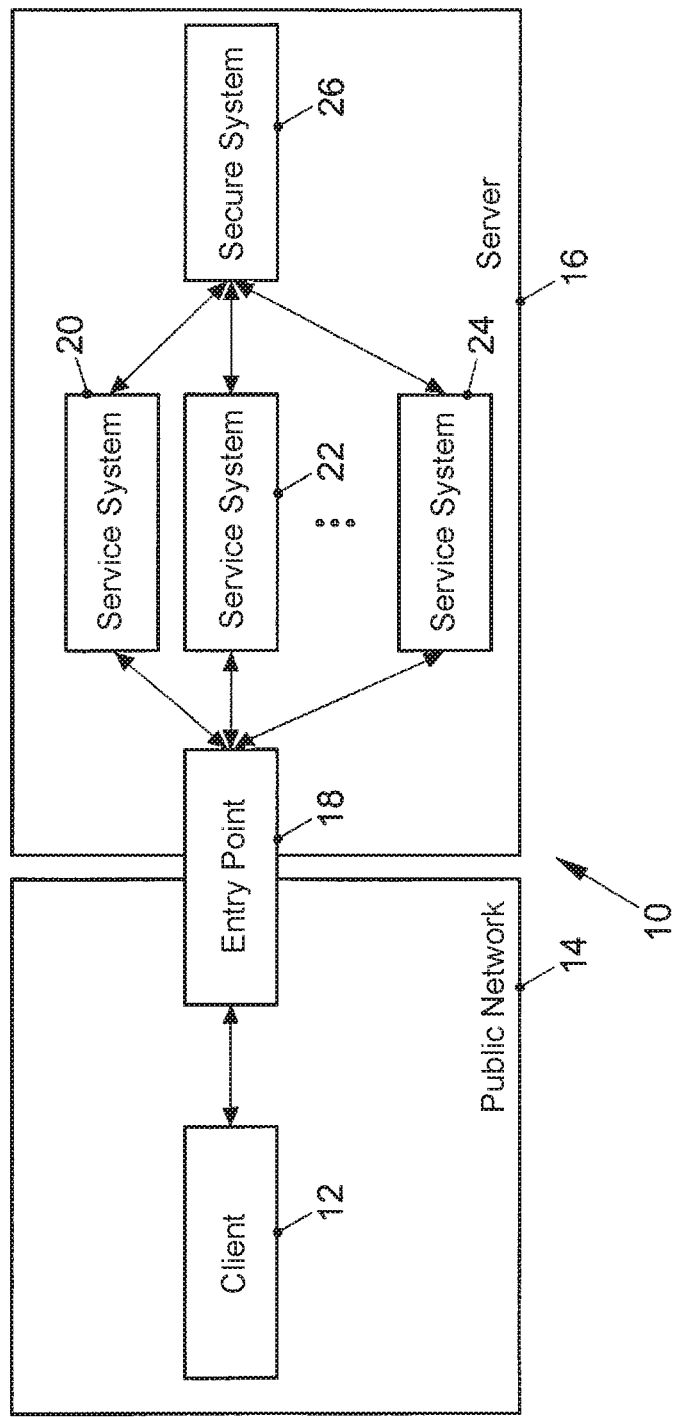
FIG. 1 shows a schematic representation of a communication architecture of a client-server system.

A client, such as, for example, a vehicle with online services, normally authenticates a server, such as, for example, an IT backend, as an entire system, but not the underlying systems individually. The authentication of a back-end system normally ends at the entry point into the backend, for example, via a certificate verification with protocols such as TLS. Methods of this type are commonplace in the current IT environment.

If, for example, jobs are generated in the backend for a vehicle, these jobs are usually stored in a job list for the vehicle and the origin of these jobs is not authentically verifiable. It suffices therefore for an attacker to manipulatively lengthen this list by operating one of the interfaces or by directly manipulating the data.

As described, conventional methods end at the entry point into the backend. A continuation into underlying systems is expensive or inappropriate from a security perspective: It is possible, for example, to create a further protected channel into the end system via the established, protected channel to the entry point, i.e., an encapsulation which generates a substantial overhead and is not always possible. Alternatively, only one channel is set up through to the end system and the entry point is only a gateway. However, this makes the network architecture insecure.

US 2010/0287375 A1 discloses the operation of an end-to-end security channel between an IC card and a server based on random numbers and an asymmetric encryption method.

DE 60310 814 T2 discloses an encryption key management method for a mobile communication system, wherein an encryption module is added to a user terminal.

DE 10 2008 050 406 A1 discloses a method for transmitting data between a computer of a motor vehicle and a central computer of a computer network in which the connection set-up of a communication connection is performed in a protected manner by means of a challenge-response method, wherein the data transmission is started only in the event of a successful connection set-up.

Disclosed embodiments improve security in the communication with a server with a plurality of service systems.

This is achieved by a method and a client-server system.

The disclosed method for implementing an encrypted client-server communication, wherein the server comprises an entry point, a plurality of service systems disposed behind the entry point and a secure system provides the following operations:

incorporating common cryptographic material into the client and into the secure system;

deriving key material from the common cryptographic material in the client for an encrypted communication between the client and a service system;

deriving key material from the common cryptographic material in the secure system for an encrypted communication between the client and a service system; and transferring the key material into the service system; or retaining the key material in the secure system.

The disclosed method offers the benefit that an end-to-end security from the executing service system in the server to the executing client is enabled, in fact through an entry point of the server. This enables a robust subdivision in the server backend into a plurality of separate systems. The breaking of one system does not result in the complete compromising of the server or backend and likewise of the client. The reciprocal influencing of systems which is thereby prevented is a characteristic on which most more complex attacks are based, particularly if they are automatically further disseminated. The security of the communication between the server and one or more clients can thus be improved. The security of the protected function is independent from entry points into the clients or into the server, thus offering an independence from further protection concepts in the client and in the server. Precisely one key exists for each application, and different keys could even be used for each invocation through unique derivation functions.

The common cryptographic material may be a symmetric key or an asymmetric key pair. The use of symmetric cryptographic methods allows a deployment even for less powerful clients, such as, for example, some control units in vehicles. Alternatively, asymmetric cryptography can be used.

It can be provided that the key material is applied in the client and in the service system or the secure system to data that are to be transmitted. This operation extends beyond the pure implementation and describes a secure client-server communication. The client can have a key for each service system of the server, so that in each case dedicated, secure communication channels are created.

It can furthermore be provided that the client and the entry point reciprocally authenticate one another via asymmetric keys. This allows the use of standard protocols, such as, for example, TLS 1.2, with keys signed by a PKI (Public Key Infrastructure).

It can be provided that a further entry point for the client is provided in the client and the following operations are carried out for systems of the client provided behind the further entry point:

incorporating common cryptographic material into the systems of the client and into the secure system;

deriving key material from the common cryptographic material in the systems of the client for an encrypted communication between the respective system of the client and a service system.

The structure in the server is thus mapped to a certain extent as a mirror image in the client, so that a plurality of individual systems in the client are also helped towards a dedicated communication. This enables an individual system in the client to set up an encrypted end-to-end connection or communication to a specific service system in the server.

The disclosed client-server system, wherein the server comprises an entry point, a plurality of service systems disposed behind the entry point and a secure system, provides that common cryptographic material is provided in the client and in the secure system, that key material derived from the common cryptographic material is provided in the client for an encrypted communication between the client and a service system, and that key material derived from the common cryptographic material is provided in the service systems for an encrypted communication between the client and the respective service system. The same benefits and modifications as described above apply. The proposed client-server system is helpful if a manufacturer simultaneously makes end products and backend functionality of these end products available and furthermore finds a way to incorporate keys which are also represented in the backend and for which it can calculate dedicated keys on both sides through a uniquely defined derivation function. A significant increase in complexity for the attacker is thereby achieved. It no longer suffices to circumvent a protection measure. A weak point on a computer with access rights to the backend is not yet sufficient to trigger actions on the end product.

The common cryptographic material may be a symmetric key or an asymmetric encryption. The use of symmetric keys allows a deployment even for less powerful clients, such as, for example, some control units in vehicles. Alternatively, asymmetric cryptography can be used.

It can be provided that a further entry point for the client is provided in the client and that systems of the client are provided behind the further entry point, that common cryptographic material is provided in the systems of the client and in the secure system, and that key material derived from the common cryptographic material is provided in the systems of the client for an encrypted communication between the respective system of the client and a service system. The structure in the server is thus mapped to a certain extent as a mirror image in the client, so that a plurality of individual systems in the client are also helped towards a dedicated communication. This enables an individual system in the client to set up an encrypted end-to-end connection or communication to a specific service system in the server.

It can furthermore be provided that the client is a vehicle and that the server is a backend of a manufacturer of the vehicle and/or of a service provider. The proposed system is suitable for architectures with numerous clients, such as, for example, vehicles, domestic appliances, smart home installations, and a server or backend with numerous services. For individual safety-critical services, such as, for example, opening a door, starting a vehicle, viewing a vehicle position, such a separation of the authentication of systems in the backend is enabled here to improve safety and enable a clear separation of roles. This separation must be verifiable in the vehicle.

It can be provided that the systems of the client are control units. Control units of this type are widespread in vehicles or domestic appliances, thereby simplifying an implementation and opening up a multiplicity of possible applications.

It can furthermore be provided that the further entry point is an online control unit. The online control unit often performs the online communication functionality for the further underlying control units, thereby simplifying an implementation and opening up a multiplicity of possible applications.

The different embodiments specified in this application are combinable with one another, unless otherwise specified in individual cases.

FIG. 1 shows a client-server system 10 with a client 12 which is located in a public area or network 14, such as the Internet. The client-server system 10 furthermore comprises a server 16, such as, for example, a backend for online services. The client 12 can establish a communication connection to the server 16 via an entry point 18 of the server 16. The connection may be established in a wireless or wired manner, or through a combination of both.

The client 12 may, for example, be a control unit of a vehicle such as an automobile, truck, bus, motor cycle or a railroad vehicle, aircraft or watercraft. In other examples, the client 12 may be a mobile or stationary device or its control unit, such as, for example, a domestic appliance or a component of a smart home installation. The server 16 may, for example, be a backend of the manufacturer of the client 12, by means of which the manufacturer offers online services for its devices. The server 16 may also be allocated to an external service provider.

A backend or server 16 which may also consist of a plurality of distributed servers or processing units, is normally responsible for a multiplicity of clients 12. A plurality of service systems 20, 22, 24, three of which are shown by way of example, are provided in the server 16. The service systems 20, 22, 24 may be implemented in hardware, software or a mixture of both. The service systems 20, 22, 24 are in communication with the entry point 18.

In the automobile services sector, this may, for example, be a navigation service, a tracking service, a service for opening a door or a service for starting the vehicle. In a smart home environment, a service for opening a door or a service for starting a device such as a washing machine, for example, may be provided. If the client 12 invokes one of the service systems 20, 22, 24 or one of the services offered by it, or if the server 16 initiates one of the service systems 20, 22, 24, a connection is set up between the client 12 and the respective service system 20, 22 or 24. This may be a connection held at least for the service duration, or a temporary, possibly periodic, message or data transmission.

These service systems 20, 22, 24 are located in the server 16 behind the entry point 18. This means that the client 12 can access one, some or all of the service systems 20, 22, 24 via the access point 18. The connection from the client 12 to the entrance point or entry point may be protected by an asymmetric cryptography.

The server 16 furthermore comprises a secure system 26 which performs, for example, the key generation and management of the manufacturer or service provider. Each of the service systems 20, 22, 24 is connected to the secure system 26. Each of these service systems 20, 22, 24 has a bilaterally authenticated and confidential connection to the secure system 26.

The secure system 26, the service systems 20, 22, 24 and the entry point 18 may be disposed in a server unit or may be distributed, for example, in an Intranet. The term server as used here comprises both options.

Figure 2:
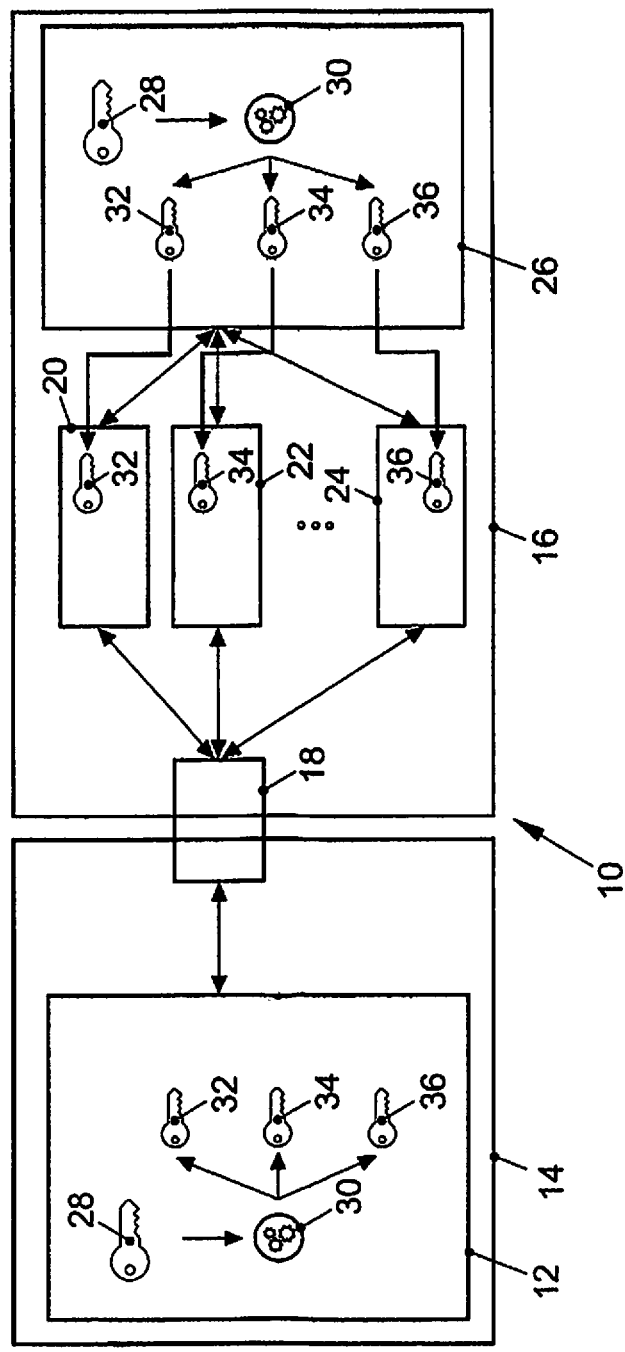
FIG. 2 shows a schematic representation of a key distribution of the client-server system.

FIG. 2 shows a key distribution for the client-server system 10. The secure system 26 and the client 12 contain common cryptographic material, such as, for example, a symmetric key 28. In the manufacturing of the client 12, the symmetric key 28 may be incorporated from the secure system 26 into the client 12.

For protected communication with the client 12, the service system 20, for example, requests a key from the secure system 26. The secure system 26 then generates a specific key 32 in a key derivation 30. This specific key 32 is derived by the secure system 26 from the symmetric key 28 in relation to the service which the service system 20 provides. Similarly, a specific key 34 is generated for the service system 22 and a further specific key 36 for the service system 24.

The specific key 32 is transmitted to the service system 20. This is done via protected communication. Similarly, the specific key 34 is transmitted to the service system 22 and the specific key 36 is transmitted to the service system 24. Each of the service systems 20, 22 and 24 then uses the respective specific key 32, 34 or 36 in the communication with the client 12 to protect its data for the client 12, for example, by means of signing and encryption.

On receiving the data from the service system 20, 22 or 24, the client 12 can derive the respective specific key 32, 34, 36 in a key derivation similarly from the symmetric key 28. Alternatively, it can be provided that the specific keys 32, 34 and 36 can already be incorporated into the client 12, for example, during its manufacture. The derivation in the client 12 saves memory space and transmission overhead here. The same also applies to the secure system 26. The specific keys 32, 34 and 36 can also in principle all be stored individually there, but this incurs substantial cost, for example, in a vehicle fleet with millions of participants. A key must be provided for each service, so the number of keys equals the number of vehicles multiplied by the number of services.

The specific key 32, 34 or 36 in the client 12 is identical to the corresponding key in the service system 20, 22 or 24. The client 12 can verify or decrypt the data with the specific key 32, 34 or 36.

The client 12 can then be sure that the data have really been generated by the specific service system 20 and not by the entry point 18 or a different service system 22 or 24. The secure system 26 could theoretically generate the data, but this depends on the secure system 26 being secure. This security is simple to achieve, since the scope of functions of the secure system 26 is normally restricted and can therefore be mapped, in particular, in secure hardware. This protected communication also operates in the opposite direction from the client 12 to the service system 20 with the same key and similarly to other service systems 22 and 24.

Instead of issuing the specific keys 32, 34 and 36, the secure system 26 could also receive the data or a representation such as a hash value from the service systems 20, 22 and 24 and itself apply the respective specific key to the corresponding data. In terms of technical security, the specific keys 32, 34 and 36 remain only in the secure system 26. However, this could increase the complexity of the secure system.

Figure 3:
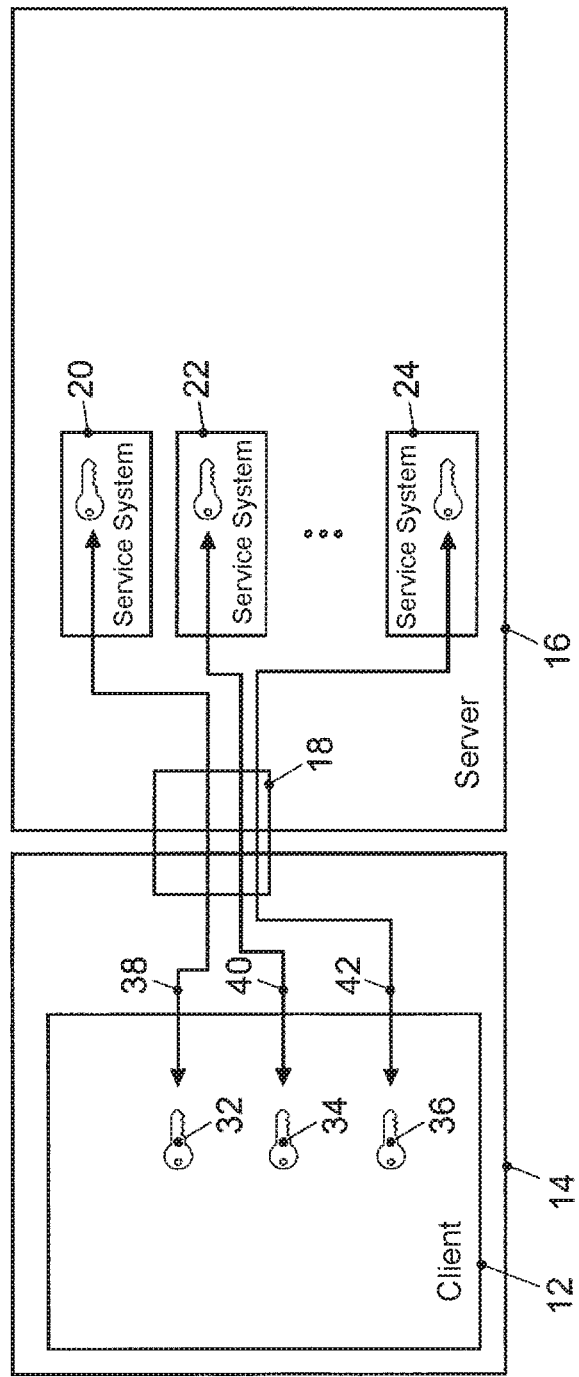
FIG. 3 shows a schematic representation of an end-to-end encryption of the client-server system.

FIG. 3 shows a schematic representation of an end-to-end encryption of the client-server system 10. As shown, a protected communication channel 38 exists between the client 12 and the service system 20. The encryption of the communication channel 38 is based on the specific key 32 which is present in both the client 12 and the service system 20. The communication channel 38 runs through the entry point 18, but this passage is to some extent encapsulated, since the entry point 18 does not recognize the specific key 32. The entry point 18 cannot thus access the communication channel 38 or therefore the messages and data forwarded via it. A protected end-to-end connection and encryption is made available, wherein the end points are the client 12 and the service system 20.

Similar to the previously described communication channel 38 between the client 12 and the service system 20, further communication channels 40 and 42 are provided between the client 12 and the service system 22 and 24. The individual communication channels 38, 40 and 42 are strictly separated so that no access is possible between the communication channels.

Figure 4:
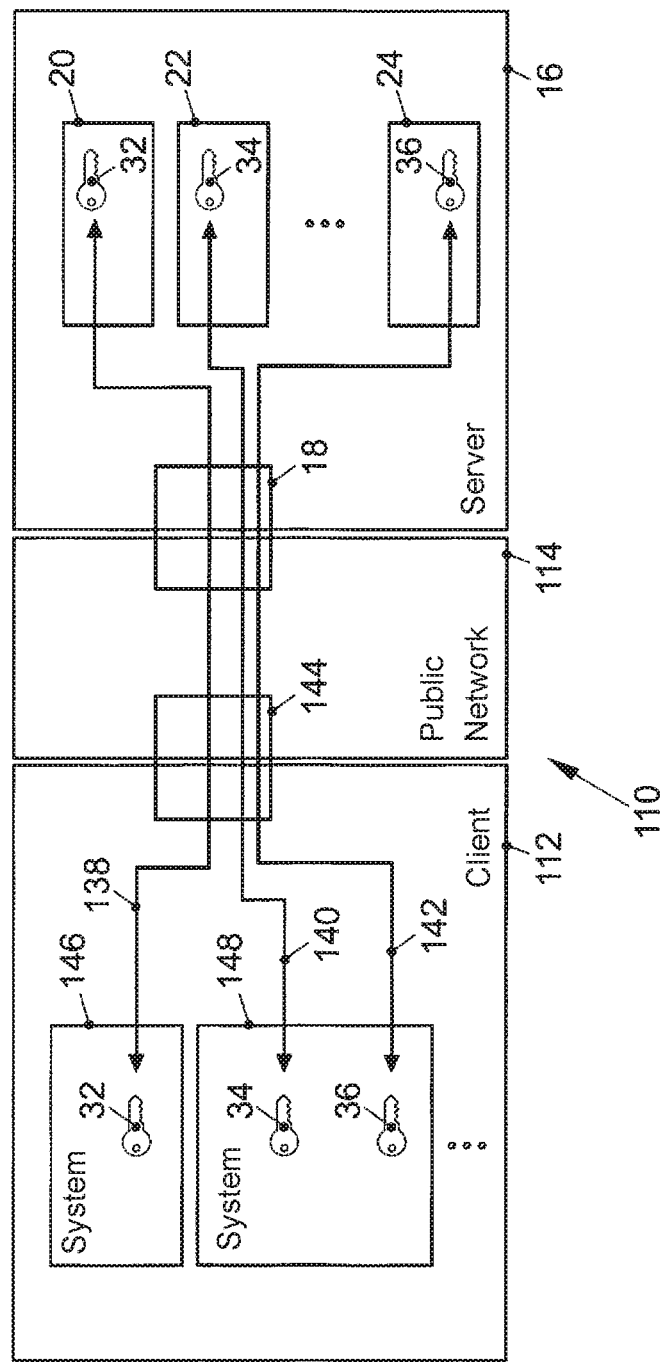
FIG. 4 shows a schematic representation of a further communication architecture of a client-server system.

FIG. 4 shows a schematic representation of a further communication architecture of a client-server system 110. On the server side, the client-server system 110 corresponds to the client-server system 10 from the previous figures. The client 112 differs from the client 10 from the previous figures in that the client 112 is designed in a similar manner to the server 16.

In the client 112, a further entry point 144 is provided for the client 112, so that the two entry points 18 and 144 communicate with one another via the public network 114. The communication between the two entry points 18 and 144 is, for example, protected via asymmetric cryptography. The entry point 144 may, for example, be an online control unit.

Systems 146, 148, as in this example control units of the client 112, are provided behind the further entry point 144, i.e., inside the client 112. The control units 146, 148 are allocated in each case to specific functions, such as, for example, navigation or access control. In this example, the control unit 146 is a control unit for navigation and the control unit 148 is a control unit for access control to the vehicle in which the control unit 148 is located.

Similar to the previously described figures, common cryptographic material is first incorporated into the systems 146, 148 of the client 112 and into the secure system 26 for the implementation of the communication connections. For reasons of clarity, this is not shown here. For details, reference is made to the key derivation shown in FIG. 2, which is performed here in a similar manner. Key material 32, 34, 36 is derived accordingly from the common cryptographic material in the systems 146, 148 of the client 112 for an encrypted communication between the respective system 146, 148 of the client 112 and a service system 20, 22, 24 of the server 16. It is also possible for the incorporation of the common cryptographic material and the key derivation not to be performed directly in the corresponding systems 146 and 148, but in a further system (not shown here) of the client 112, such as, for example, a further secure system. The specific keys 32, 34 and 36 generated there are then transferred into the respective system 146 and 148.

Independently from the generation of the specific keys 32, 34 and 36, the status following the actual generation is shown in FIG. 4, in which the specific keys 32, 34 and 36 are already distributed. In this example, a specific key 32 is present in the system 146 and the other two specific keys 34 and 36 are present in the other system 148.

A communication channel 138 is thus created between the system 146 of the client 112 and the service system 20 of the server 16. This may, for example, be a navigation service. Communication channels 140 and 142 are present between the system 148 of the client 112 and the service systems 22 and 24 of the server 16. The service system 22, for example, provides a door-opening functionality and the service system 24 provides an access path via Smartphone.

It is evident that a system 148 can access a plurality of service systems 22 and 24 of the server 16. The communication channels 140 and 142 are strictly separated here also, thereby increasing security. Similarly, the communication channels 138 on the one hand and 140 and 142 on the other hand, i.e., the communication channels of the two systems 146 and 148, are clearly separated from one another. The communication channels 138, 140 and 142 form protected end-to-end connections between the systems 146 and 148 and the service systems 20, 22 and 24. The communication channels 138, 140 and 142 run through the two entry points 144 and 18, and since the specific keys 32, 34 and 26 are, however, not known there, the communication cannot be accessed there.

The procedure proposed here allows a clear and secure separation of the service systems 20, 22 and 24 according to the scope of functions, thereby increasing the security of the backend and the communication.

REFERENCE NUMBER LIST

10 Client-server system
12 Client
14 Public network
16 Server
18 Entry point
20 Service system
22 Service system
24 Service system
26 Secure system
28 Symmetric key
30 Key derivation
32 Specific key
34 Specific key
36 Specific key
38 Communication channel
40 Communication channel
42 Communication channel
110 Client-server system
112 Client
114 Public network
138 Communication channel
140 Communication channel
142 Communication channel
144 Further entry point
146 System
148 System

The invention claimed is:

1. A method for implementing an encrypted client-server communication between a server and a transportation vehicle client, wherein the server comprises an entry point, a plurality of service systems disposed behind the server entry point, and a secure encryption key generation and management system, the method comprising:
incorporating common cryptographic material into the transportation vehicle client and into the secure encryption key generation and management system;
deriving key material from the common cryptographic material in the transportation vehicle client for an encrypted communication between the transportation vehicle client and a service system of the plurality of service systems disposed behind the server entry point, wherein the key material associated with the service system is specific to the service system and independent from key material associated with the entry point;
deriving key material from the common cryptographic material in the secure encryption key generation and management system for an encrypted communication between the transportation vehicle client and the service system of the plurality of service systems disposed behind the server entry point, wherein the key material associated with the service system is specific to the service system and independent from key material associated with the entry point; and
transferring the specific key material into the associated service system of the plurality of service systems disposed behind the server entry point or retaining the specific key material in the secure encryption key generation and management system, to provide encrypted client-server communication between the associated service system of the plurality of service systems disposed behind the server entry point and control systems of the transportation vehicle client,
wherein a further entry point for the transportation vehicle client is provided in the transportation vehicle client,
wherein control systems of the transportation vehicle client are provided behind the further entry point,
wherein common cryptographic material is provided in the control systems of the transportation vehicle client and in the secure encryption key generation and management system,
wherein key material derived from the common cryptographic material is provided in the control systems of the transportation vehicle client for an encrypted communication between the respective control system and the corresponding service system of the plurality of service systems disposed behind the server entry point, and
wherein the further entry point is an online control unit.

2. The method of claim 1, wherein the common cryptographic material is a symmetric key or an asymmetric key pair.

3. The method of claim 1, transportation vehicle wherein the key material is applied in the transportation vehicle client and in the service system of the plurality of service systems disposed behind the server entry point or the secure encryption key generation and management system to data that are to be transmitted.

4. The method of claim 1, wherein the transportation vehicle client and the server entry point reciprocally authenticate one another via asymmetric keys.

5. The method of claim 1, wherein a further entry point for the transportation vehicle client is provided in the transportation vehicle client and the following operations are carried out for the control systems of the transportation vehicle client by the service systems provided behind the further entry point:
incorporating common cryptographic material into the control systems of the transportation vehicle client and into the secure encryption key generation and management system;
deriving key material from the common cryptographic material in the control systems of the transportation vehicle client for an encrypted communication between one of the control systems of the transportation vehicle client and a corresponding service system of the plurality of service systems disposed behind the server entry point.

6. The method of claim 1, wherein the specific key material is independent from the key material associated with the entry point to preserve integrity of the key material of the entry point.

7. The method of claim 1, wherein the service includes one of a vehicle navigation service, a vehicle tracking service, a service to open a vehicle door, a service to start, a service to turn on or activate the vehicle, a service to open a household door, and a service to start a household device.

8. A client-server system comprising:

a server that includes an entry point, a plurality of service systems disposed behind the entry point of the server, and a secure encryption key generation and management system; and a transportation vehicle client, wherein common cryptographic material is provided in the transportation vehicle client and in the secure encryption key generation and management system, wherein key material derived from the common cryptographic material is provided in the transportation vehicle client for an encrypted communication between the transportation vehicle client and a service system of the plurality of service systems disposed behind the server entry point, wherein the key material associated with the service system is specific to the service system and independent from key material associated with the entry point, wherein the specific key material derived from the common cryptographic material is transferred into the associated service systems of the plurality of service systems disposed behind the server entry point by an encrypted communication between the transportation vehicle client and the respective service system of the plurality of service systems disposed behind the server entry point to provide encrypted client-server communication between the associated service system of the plurality of service systems disposed behind the server entry point and control systems of the transportation vehicle client, wherein a further entry point for the transportation vehicle client is provided in the transportation vehicle client, wherein control systems of the transportation vehicle client are provided behind the further entry point, wherein common cryptographic material is provided in the control systems of the transportation vehicle client and in the secure encryption key generation and management system, wherein key material derived from the common cryptographic material is provided in the control systems of the transportation vehicle client for an encrypted communication between the respective control system and the corresponding service system of the plurality of service systems disposed behind the server entry point, and wherein the further entry point is an online control unit.

9. The client-server system of claim 8, wherein the common cryptographic material is a symmetric key or an asymmetric encryption.

10. The client-server system of claim 8, wherein the server is a backend of a manufacturer of the transportation vehicle and/or of a service provider.

11. The client-server system of claim 8, wherein the control systems of the transportation vehicle client are control units within the transportation vehicle.

12. The client-server system of claim 8, wherein the specific key material is independent from the key material associated with the entry point to preserve integrity of the key material of the entry point.

13. The client-server system of claim 8, wherein the service includes one of a vehicle navigation service, a vehicle tracking service, a to open a vehicle door, a service to start, a service to turn on or activate the vehicle, a service to open a household door, and a service to start a household device.

* * * * *